United States Patent [19]

Unruh et al.

[11] 3,953,040
[45] Apr. 27, 1976

[54] LEVELING AND LOCKUP SYSTEM FOR WHEEL TRACTOR SUSPENSION SYSTEM

[75] Inventors: Dale H. Unruh, Peoria, Ill.; Jan B. Yates, Reynoldsburg, Ohio

[73] Assignee: Caterpillar Tractor Co., Peoria, Ill.

[22] Filed: Mar. 5, 1975

[21] Appl. No.: 555,655

[52] U.S. Cl. ............................. 280/6 H; 280/702; 56/209
[51] Int. Cl.² ................................... B60G 11/26
[58] Field of Search ............... 280/124 F, 6 H, 6.1, 280/6.11; 56/209

[56] References Cited
UNITED STATES PATENTS

| | | | |
|---|---|---|---|
| 3,643,970 | 2/1972 | Gauchet | 280/124 F |
| 3,869,141 | 3/1975 | Ito | 280/124 F |

*Primary Examiner*—Philip Goodman
*Attorney, Agent, or Firm*—Phillips, Moore, Weissenberger, Lempio & Strabala

[57] ABSTRACT

A cushioning, leveling and lockup system for a suspended axle vehicle having a leveling control subsystem which automatically corrects any changes in the distance between a vehicle frame and axle by communicating pressurized fluid from a pressure source to reposition fluid suspension cylinder struts, and a lockup subsystem having a lockup valve which isolates spring cushioning devices from the suspension struts, to reduce suspension cushioning, the lockup subsystem permitting rotation about the longitudinal axis of the vehicle or roll oscillation during lockup by interconnecting the cylinders through a flow path across the lockup valve.

11 Claims, 2 Drawing Figures

LEVELING AND LOCKUP SYSTEM FOR WHEEL TRACTOR SUSPENSION SYSTEM

BACKGROUND OF THE INVENTION

Tractor-scrapers used in earthworking typically operate under three conditions; loading, transporting and unloading, all usually accomplished while the vehicle combination is moving. Suspension requirements vary for these conditions. During the transporting phase, the prime requirement is for cushioning of road shocks imparted to the vehicle, either loaded or unloaded and damping of bounce resulting from such road shocks. During the loading phase it is important to maintain the scraper and scraper bowl, where the load is carried, at a desired level to insure an even cut of earth. Road shock suppression, or cushioning, is relatively unimportant because of the slow speed of the vehicle combination. As earth is received in the scraper bowl, the weight of the load is constantly increasing and consequently, without a lockup means, the scraper bowl and scraper may move to a lower position in relation to the tractor axle, the scraper then taking a progressively deeper bite of earth as the load increases. It has been found that during this loading phase it is also desirable to permit a degree of side-to-side rotation about the longitudinal axis of the vehicle, or roll oscillation, for better cutting action. During unloading the scraper bowl will move upward because of the loss of weight. Although the bowl position is not critical as in the loading phase, if the suspension system were not leveled, the subsequent unloaded condition with the suspension system adjusted for a full load would result in little or no shock cushioning during the return trip for a subsequent load.

There are several types of suspension systems available on the market today for an earthworking tractor-scraper vehicle. The two most generally accepted types of suspension systems for tractor-scrapers are either the suspended cushion hitch or the suspended axle. The suspended cushion hitch depends upon ride cushioning means incorporated into the hitch connecting the tractor and scraper while the axles are rigidly affixed to the tractor frame and the scraper frame. The suspended axle suspension system utilizes a suspension arm pivotably connected at one end to the tractor frame and carrying at the other end of the axle. Suspension cylinder struts are affixed between the axle end of the suspension arm and the frame. Means for cushioning road shock may be included with such suspension cylinders. Either type of suspension system offers characteristics desirable in an earth-working tractor-scraper to improve the rideability of the vehicle. Typical of the suspended axle system are characteristics which do not provide for synchronized leveling of the vehicle while loading and unloading, nor permit the vehicle to roll when the system is locked up for loading purposes.

Typical leveling systems for vehicle suspension are disclosed in U.S. Pat. Nos. 3,784,228 and 3,618,972. Neither of these patents provide for locking-up or isolating the cushioning qualities of the suspension system. U.S. Pat. No. 3,539,197 discloses a trim corrector for insuring that the vehicle frame is maintained in a level status while damping out transient signals received by the trim corrector due to acceleration and deceleration. Although these three patents deal with leveling devices, none of them address the problem of this invention, i.e., locking out the ride cushioning capability while providing limited roll oscillation. U.S. Pat. Nos. 3,118,686 and 3,135,529 address suspended axle wheel suspension systems but do not address a load leveling feature or a roll oscillation feature. U.S. Pat. Nos. 3,311,389 and 3,321,216 (assigned to the assignee of this invention) provide leveling means in suspended cushion hitch tractor-scraper combinations but do not address a roll oscillation feature.

SUMMARY OF THE INVENTION

Accordingly, it is an object of this invention to provide a cushioning, leveling and lockup system in a suspended axle vehicle which provides for continuous load leveling and selective cushioning of road shocks.

It is a further object of this invention to provide a cushioning, leveling and lockup system which while fulfilling the above objective permits dampened roll oscillation while the cushioning capability is deactivated.

Broadly stated, the invention is a suspension system for a vehicle having a vehicle frame and an axle, the axle suspended from the vehicle frame and capable of moving toward and away from the vehicle frame, and further the axle capable of rotating about an axis disposed generally longitudinally of the vehicle. Means are incorporated to sense the relative position of the axle toward and away from the frame, and in response to this sensed relative position the system includes means to maintain the axle and vehicle frame generally within a desired range of relative positions. Ride cushioning may be selectively activated and deactivated.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
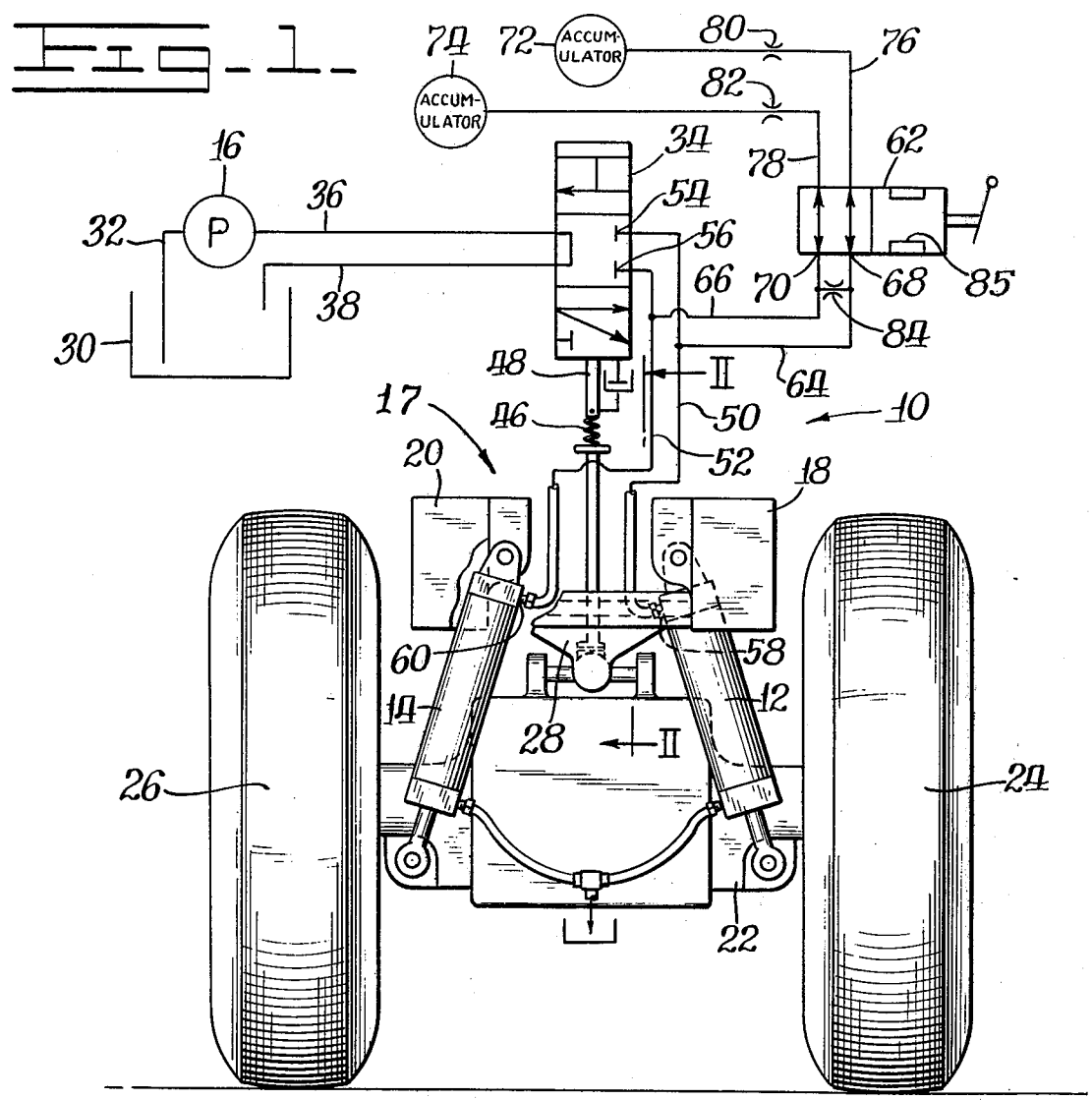
FIG. 1 is an overall view of the cushioning, leveling and lockup system according to the present invention with the hydraulic circuit shown in part schematically.
Figure 2:
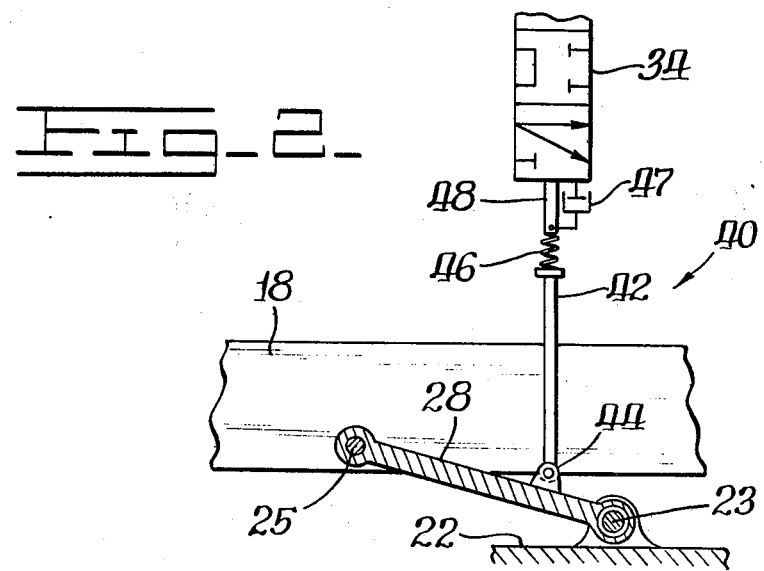
FIG. 2 illustrates a cross section of a portion of the cushioning, leveling and lockup system shown in FIG. 1 taken at line II-II and depicts the linkage arrangement for sensing axle movement.

Referring to the drawing at FIG. 1, the suspension system and its associated controls are generally indicated at 10. A pressurized fluid is supplied to a pair of suspension cylinder struts 12 and 14 by pump 16. The head ends of suspension cylinders 12 and 14 are respectively pivotably pinned to main frame rail members 18 and 20 of a vehicle frame 21. The rod ends of suspension cylinders 12 and 14 are respectively pivotably pinned to the axle housing 22 adjacent to each nearest respective wheel member 24 and 26. Referring now to FIG. 2, the axle housing 22 is rotatably fixed by a ball joint 23 to a suspension link 28. Ball joint 23 permits rotation of the axle about the longitudinal axis of suspension link 28. Suspension link 28 is pivotably affixed to an interconnecting rod 25 affixed to frame members 18 and 20. The link 28 is of the trailing type, and provides that the axle housing 22 is movable generally toward and away from the vehicle frame, and further establishes that the axle housing 22 may rotate about an axis which generally corresponds to the longitudinal axis of the vehicle.

Pump 16 acquires fluid from sump 30 via conduit 32. Pump 32 communicates this fluid to the leveling control valve 34 via a conduit 36. The leveling control valve 34 is a three position valve rigidly mounted to the vehicle frame 21. While in a first position, shown in FIG. 1, leveling control valve 34 blocks communication from pump 16 to suspension cylinders 12 and 14 and returns fluid to pump 30 via conduit 38; While in a second position leveling control valve 34 communicates fluid pressure from pump 16 to suspension cylinders 12 and 14; and while in a third position leveling control valve 34 vents fluid pressure from suspension cylinders 12 and 14 to pump 30. Leveling control valve 34 is responsive to a change in vertical position of the frame 17 with respect to the axle housing 22. Response is attained through a linkage arrangement 40 shown in FIG. 2. Such linkage arrangement 40 is shown as a mechanical connection in FIG. 2. It is to be understood that leveling control valve 34 may be actuated by other means such as hydraulic pilot valve or electrical or electronic means.

The depicted linkage arrangement 40 consists of a rod 42 having a pivotal connection 44 with arm 28 on one end and a spring link 46 at the other end. Spring link 46 is in direct communication with leveling control valve stem 48. A dashpot 47 associated with the leveling control valve 34 and its stem 48 is well known to the industry and will not be described in further detail. It can be seen that any change in the positioning of the axle housing 22 toward and away from the main frame 17 causes a subsequent change in the position of the leveling control valve stem 48. The purpose of spring link 46 and dashpot 47 is to provide a means to dampen out any high-frequency motion which would not require a subsequent leveling change. Thus, the leveling system is only actuated when the duration of a change is substantial enough to cause leveling control valve stem 48 to be shifted.

The fluid from the pump 16 is communicated to suspension cylinders 12 and 14 via a pair of conduits 50 and 52 respectively. The conduits 50 and 52 are respectively connected to ports 54 and 56 of leveling control valve 34 and the ports 58 and 60 in the head ends of suspension cylinders 12 and 14.

Conduits 64 and 66 are branch conduits of 50 and 52 respectively. Conduits 64 and 66 communicate respectively with accumulators 72 and 74 through ports 68 and 70 of lockup control valve 62 and conduits 76 and 78. An orifice 80 in conduit 76 and an orifice 82 in conduit 78 dampen vertical motion imparted to suspension cylinders 12 and 14 respectively by restricting the flow between the accumulators 72 and 74 and suspension cylinders 12 and 14, thereby establishing a lag between pressure spikes in the head end of suspension cylinders 12 and 14 caused by roading, such lag providing a more stable system. The combination of accumulators 72 and 74 and orifices 80 and 82 provide the desired ride cushioning for the system when lockup valve 62 is in a first position as shown in FIG. 1. A restrictive orifice shunt 84 connects conduit 66 to conduit 64 between the lockup valve 62 and the junction at conduits 50 and 52. With the valve 62 in its first position, a limited degree of fluid communication is provided between conduits 64,66 through orifice 84. This orifice shunt 84 in combination with passage 85 in lockup valve 62, when lockup valve 62 is shifted to a second position, permits a greater level of fluid communication between conduits 64,66 and rotation of axle housing 22 about an axis generally disposed longitudinally of the vehicle. When lockup valve 62 is shifted to the second position accumulators 72 and 74 are isolated from conduits 64 and 66; thus, ride cushioning provided by accumulators 72 and 74 is not available at suspension cylinders 12 and 14. Orifice shunt 84 is more restrictive than orifices 80 and 82 so that during normal operation accumulator 74, orifice 82 and suspension cylinder 14 act somewhat as suspension components that are independent from accumulator 72, orifice 80 and suspension cylinder 12. Although a certain amount of rotation about the longitudinal axis or roll oscillation will occur when lockup valve 62 is in the first position, as shown in FIG. 1, such oscillation is severely limited by the restricted size of orifice shunt 84.

While the operation of the present invention is believed clearly apparent from the foregoing description, further amplification will be made in the following brief summary of such operation. With lockup valve 62 in the first position as shown in FIG. 1 and the vehicle traversing terrain, the following conditions hold true. The suspension cylinders 12 and 14 are supporting a load which is held by main frame members 18 and 20, and whenever a wheel encounters a bump the accumulator 72 or accumulator 74 will provide cushioning required for desired ride characteristics. If, however, the weight of the load carried by the vehicle would be substantial enought to cause main frame members 18 and 20 of frame 17 to move into closer proximity with axle housing 22, rod 42 will reposition leveling control valve 34 to the second position causing pump 16 to communicate pressurized fluid to the suspension system until suspension cylinders 12 and 14 extend enough to return the load to a level position. Once a level position is achieved, rod 42 will position leveling control valve 34 in its first position. Conversely, if weight of the load decreases, such as during unloading, main frame members 18 and 20 of frame 17 will move away from axle housing 22 thereby repositioning leveling control valve 34 to a third position venting fluid pressure from suspension cylinders 12 and 14 until a level position is achieved. When the level position is achieved leveling control valve 34 will be returned to the first position.

When the vehicle operator is ready to take on a new load, lockup valve 62 is shifted to its second position wherein accumulators 72 and 74 and corresponding orifices 80 and 82 are blocked from suspension cylinders 12 and 14 thereby removing the cushion or spring effect of accumulators 72 and 74 from suspension cylinders 12 and 14 and creating a substantially solid system. During loading, lockup valve 62 when in a second position and orifice shunt 84 permit communication from suspension cylinder to suspension cylinder enabling the vehicle to roll or rotate generally about the longitudinal axis of the vehicle, thus improving the ability to cut evenly. The lockup system would be necessary to maintain a good consistent depth of cut made in the soil during loading operations. Meanwhile, the combination of lockup valve 62 and orifice shunt 84, in addition to aiding stability, increases the effectiveness by permitting a degree of roll oscillation while cutting. After loading, when lockup valve 62 is returned to the first position shown in FIG. 1, increased weight in the scraper will cause the vehicle frame 17 to move toward axle housing 22, such movement activating leveling control valve 34. Pump 16 will then communicate fluid pressure to suspension cylinders 12 and 14, returning the load to the desired level position.

What is claimed is:

1. A suspension system for a vehicle having a vehicle frame and an axle, comprising:
    means interconnecting the vehicle frame and axle for providing that the axle is movable generally toward and away from the vehicle frame, and rotatable about an axis disposed generally longitudinally of the vehicle;
    sensing means for determining relative positioning of the axle generally toward and away from the vehicle frame;
    leveling means responsive to said sensing means for positioning said axle relative to the frame generally toward and away from the vehicle frame upon determination by the sensing means of positioning of the axle relative to the vehicle frame generally toward and away from said vehicle frame;
    ride cushioning means for cushioning movement of the axle generally toward the vehicle frame; and
    means selectively actuatable to deactivate said ride cushioning means, and actuatable to activate the ride cushioning means;

2. The suspension system set forth in claim 1 wherein the leveling means of said system comprise:
    a source of fluid pressure;
    a pair of suspension cylinders; and
    a leveling control valve affixed to said vehicle frame;
    said leveling control valve in response to said sensing means communicating fluid pressure to and releasing fluid pressure from said suspension cylinders.

3. The suspension system of claim 2 and means for providing that with the ride cushioning means activated, a limited degree of fluid communication is allowed between the cylinders, and with the ride cushioning means deactivated, a relatively greater fluid communication is allowed between the cylinders.

4. The system set forth in claim 2 wherein the means interconnecting the vehicle frame and axle comprise a suspension link and wherein the sensing means comprise a sensing rod pivotably connected at one end to the link and at the other end associated with the leveling control valve.

5. The system set forth in claim 4 wherein the leveling control valve comprises a three position valve wherein with the valve in a first position said leveling control valve blocks communication of fluid pressure to and release of fluid pressure from said suspension cylinders; wherein with the valve in a second position said leveling control valve communicates fluid pressure to said suspension cylinders; and wherein with the valve in a third position said leveling control valve vents fluid pressure from said suspension cylinders.

6. The system set forth in claim 3 wherein the ride cushioning means comprise:
    a pair of accumulators, each suspension cylinder being associated with one accumulator; and
    conduit means for communicating fluid pressure from each suspension cylinder to the accumulator with that suspension cylinder.

7. The system set forth in claim 6 wherein the means for selectively activating and deactivating said ride cushioning means comprises:
    a two position lockup valve;
    said lockup valve blocking said conduit means for communicating fluid pressure from each suspension cylinder to the accumulator associated with that suspension cylinder while in a first position, and said lockup valve communicating fluid pressure through said conduit means from each suspension cylinder to the accumulator associated with that suspension cylinder while in a second position.

8. The system set forth in claim 3 wherein the means for providing that, with the ride cushioning means activated, a limited degree of fluid communication is allowed between the cylinders comprise restrictive orifice means, and wherein the means for providing that, with the ride cushioning means deactivated, a relatively greater fluid communication is allowed between the cylinders comprise said restrictive orifice means and additional passage means interconnecting the conduit means.

9. The system set forth in claim 7 wherein the means for providing that, with the ride cushioning means activated, a limited degree of fluid communication is allowed between the cylinders comprise restrictive orifice means interconnecting the conduit means, and wherein the means for providing that, with the ride cushioning means deactivated, a relatively greater fluid communication is allowed between the cylinders comprise said restrictive orifice means and additional passage means interconnecting the conduit means.

10. The system set forth in claim 9 wherein the additional passage means comprise passage means defined by said lockup valve.

11. The suspension system set forth in claim 1 further comprising dampening means associated with the leveling means for dampening out relatively high frequency oscillatory determinations of axle position by the sensing means and allowing relatively lower frequency determinations of axle position by the sensing means to act upon the leveling means.

* * * * *